Jan. 25, 1966  G. MATHUS  3,230,643
ATOMIC MODEL

Filed April 4, 1963  2 Sheets-Sheet 1

INVENTOR.
Gregory Mathus
BY
Ezekiel Wolf, Wolf + Greenfield
ATTORNEYS

Jan. 25, 1966  G. MATHUS  3,230,643
ATOMIC MODEL
Filed April 4, 1963  2 Sheets-Sheet 2

INVENTOR.
Gregory Mathus
BY
Ezekiel Wolf, Wolf & Greenfield
ATTORNEYS

United States Patent Office 3,230,643
Patented Jan. 25, 1966

3,230,643
ATOMIC MODEL
Gregory Mathus, West Hartford, Conn., assignor to Morningstar Corporation, Cambridge, Mass., a corporation of Massachusetts
Filed Apr. 4, 1963, Ser. No. 270,605
5 Claims. (Cl. 35—18)

This invention relates to models for exhibiting certain physical characteristics of molecules and more particularly comprises an improvement of the Molecule Demonstrator for Stereochemistry disclosed in the Dreiding patent, No. 2,974,425 dated March 14, 1961.

The molecule demonstrators disclosed in the Dreiding patent, and widely known as Dreiding models, are used successfully both in the United States and abroad. However, the cost of the Dreiding models has placed them generally beyond the reach of students, and consequently the use of the models has been limited in most instances to the laboratories of teaching institutions which can afford them.

The Dreiding demonstrators and those of the present invention are made up of atomic models each having a plurality of connectors or links which are characteristic of and correspond to the nature and state of the atom represented. The links of the Dreiding models are composed of metallic tubular and rod-like members welded together at the center of the models. The basic model of the Dreiding demonstrator is composed of a pair of tubular connectors and a pair of rod-like connectors with the tubular connectors adapted to yieldably receive and rotatably engage rod-like connectors of identical or similar models. It is desirable that the molecular models made up of several atom model components be light in weight and accordingly the rods and tubes of the Dreiding models are extremely fine, and great care is required in welding the several members together in the desired spacial relationship. In the basic four connector tetragonal model the connectors radiate outwardly from their common connection in directions which coincide with the points of an equilateral tetrahedron, and a special jig is required to hold the several connectors in place during the welding operation. Consequently a single Dreiding tetragonal model costs $0.95, and a model of even the simplest molecule requires the use of several dollars worth of parts.

One important object of this invention is to make available at approximately one-tenth the cost of the Dreiding models, larger plastic models having substantially all the functional characteristics of the metallic Dreiding models.

Yet another important object of this invention is to provide atomic models which may be combined in the manner of the Dreiding models to demonstrate the characteristics of a wide variety of molecules, which are easier to manipulate and use than the Dreiding models and which can be conveniently labelled and color coded so as to make easily discerible both the kind of atom represented by each model and the number of each atom in an assembled molecule.

Still another important object of this invention is to provide members which may be yieldably connected to any of the links of the models for representing dissimilar groups joined to the molecule that includes the model.

To accomplish these and other objects, the atomic model of this invention includes among its features a nucleus made of a pair of identically shaped members which assemble together to form an equilateral tetrahedron. Connectors are secured to each of the members, which form links for assembling the model with other like models to form a molecule.

These and other objects and features of this invention along with its incident advantages will be better understood and appreciated from the following detailed description of one embodiment thereof, selected for purposes of illustration and shown in the accompanying drawing, in which.

Figure 1:
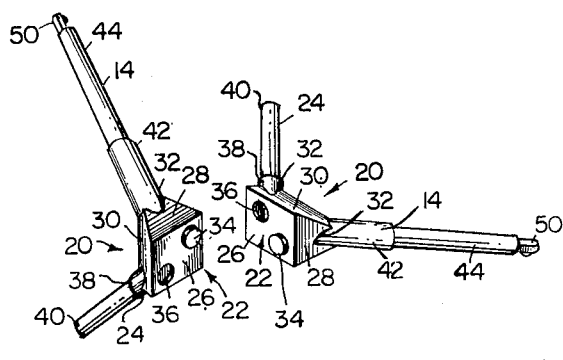
FIG. 1 is a perspective view of a pair of identical components which may be combined to form a model in accordance with the present invention.
Figure 2:
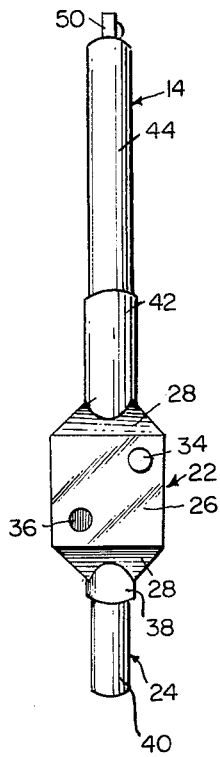
FIG. 2 is a front view of one of the components shown in FIG. 1.
Figure 4:
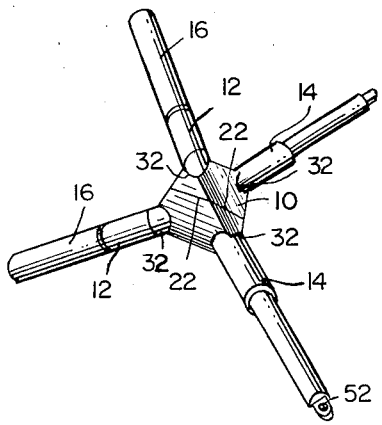
FIG. 4 is a perspective view of a completed tetragonal model.
Figure 5:
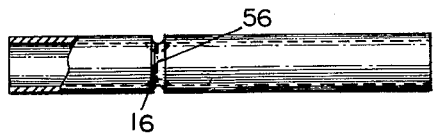
FIG. 5 is a view partly in section of one part of the model shown in FIG. 4.

The tetragonal model shown in FIG. 4, which is the basic model of the present invention is an assembly composed of two components as shown in FIG. 1 and two sleeves of the type shown in FIG. 5. The assembled model in FIG. 4 includes a core or nucleus 10 in the form of an equilateral tetrahedron from which extend a pair of tubular connectors 12 and a pair of rod-like connectors 14. The tubular connectors 12 each include a sleeve 16 shown in FIG. 5.

Figure 3:
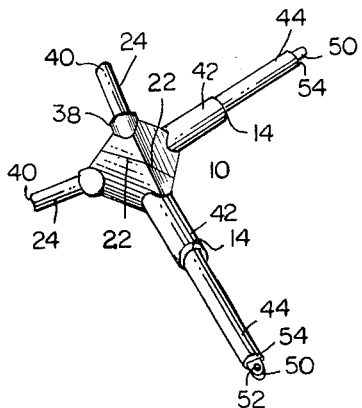
FIG. 3 is a perspective view of a model asembled from the components shown in FIG. 1.

The two identical components 20 which assemble together in the manner shown in FIG. 3 to form the heart of the completed model of FIG. 4 each have a central nucleus forming member 22 and radiating arms which form one rod-like connector 14, and the base 24 of one tubular connector 12. The two members 22 which combine to form the tetrahedron are themselves five-sided figures having a square mating face 26, a pair of generally triangular faces 28 which diverge from opposite sides of the mating face 26 and two trapezoids 30 with the longer of their parallel sides joined together to form a corner of the member and with their shorter sides connected to the other sides of the mating face. Each member 22 includes two of the corners 32 of the tetrahedron formed when the members are assembled. Aligned diagonally on the square mating face 26 of each member 22 are a pin 34 and a hole or cavity 36 spaced inwardly of and the same distance from their adjacent corners.

It is apparent from an inspection of FIGS. 1–4 that the mating faces 26 of the two members 22 may be placed in face to face relationship with the pin 34 of each face disposed in the hole 36 of the other face. When assembled in this manner, the tetrahedron-shaped nucleus 10 is formed. The two components may be permanently secured together by an appropriate cement or adhesive.

The base arm 24 at its inner end 38 has a somewhat larger diameter than at its outer end 40, and the diameter of the inner end 42 of the rod-like connector 14 is substantially the same as that of the inner end 38 of the arm 24. However, the inner portion 42 of the rod-like connector 14 is appreciably longer than the end 38 of the support arm 24, and the outer end 44 of the rod-like connector 14, which is longer than the outer end 40 of the arm 24 has the same diameter as the end 40. A coupling 50 is carried on the end face 54 of the outer end 44 of the rod-like connector. The coupling 50 is generally rectangular in cross section and carries a semispherical boss 52 on one face thereof spaced from the face 54.

The coupling 50 is designed to cooperate with the throat 56 formed in the sleeve 16 to retain the rod-like member 14 in the sleeve 16 carried on the base 24 of a separate atomic model. The sleeve 16 is shown in FIG. 4 to fit tightly over the outer end 40 of the arm 24 and is cemented in place. The sleeve 16 has a short side 16a and a longer side 16b on opposite sides of the throat 56, and the shorter side 16a fits over the outer end 40 of the base and the other side 16b of the sleeve receives the outer end 44 of the rod-like member 14.

Figure 6:
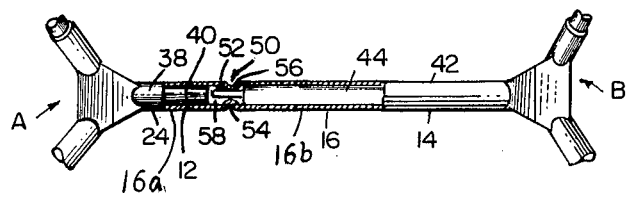
FIG. 6 is a perspective view of two models of the type shown in FIG. 4 connected together.

FIG. 6 illustrates the manner in which the sleeve 16 mounted on the support arm 24 of one atomic model cooperates with the rod-like connector or link of a second atomic model to yieldably lock the two models together. In that figure it will be noted that the sleeve 16 is permanently mounted on the arm 24 to define the tubular connector 12 of the model A and telescopically receives the outer end 44 of the rod-like connector 14 of the model B. The outer end 40 of the base arm 24 terminates short of the throat 56 to form a cavity 58 adjacent the throat 56 which receives the coupling 50 of the rod-like connector 14 of model B. The throat 56 surrounds the coupling 50 between the boss 52 and the end face 54 of the outer end 44, and the rod-like connector 14 can turn in the sleeve 16 when the boss 52 lies within the cavity 58 after having been forced through the throat. Preferably the boss 52 exerts some stabilizing frictional force upon the sleeve to prevent one model from spinning freely on the other. Obviously relative spinning may be curtailed by other means.

Figure 7:
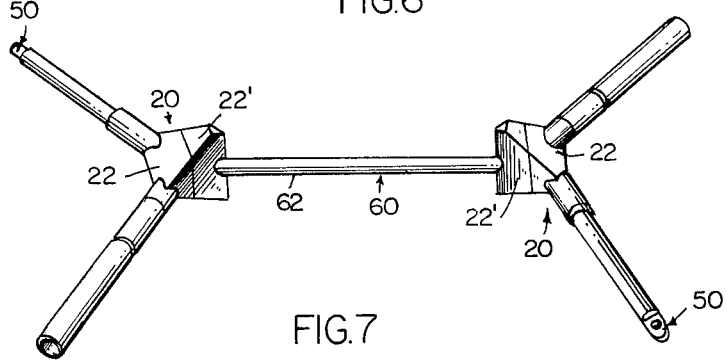
FIG. 7 is a perspective view of a model of a double bond atom constructed in accordance with this invention.

In FIG. 7 a double bond model is shown composed of two components 20 joined together by a connecting link 60. The components 20 have their nucleus-forming members 22 joined to identically shaped members 22' on the opposite ends of the rod 62 of the link. The rod 62 is equal in length to the combined length of mated rod-like and tubular connectors. Thus, the double bonded element shown in FIG. 7 includes substantially all of the features of the tetragonal model shown in FIG. 4.

Figure 8:
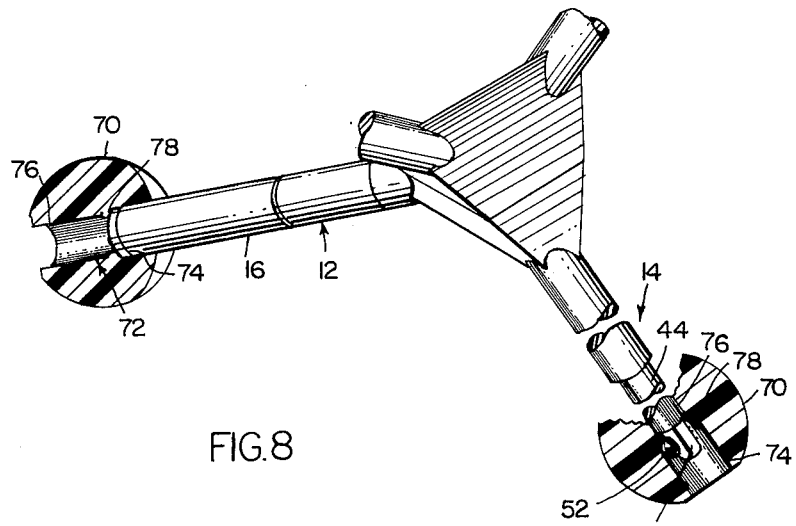
FIG. 8 is a fragmentary cross-sectional view of a tetragonal model carrying other models in accordance with this invention.

In FIG. 8 a portion of a model is shown bearing a ball on the end of a rod-like and a tubular connector. The balls 70 each include a continuous radially oriented opening 72 having a larger diameter at end section 74 than at the other end section 76. The section 74 of larger diameter is sized to receive the free end of sleeve 16 while the section 76 of smaller diameter receives the outer end 44 of the rod-like connector 14. When the outer end 44 of the rod-like connector is inserted into the section 76, the coupling 50 extends through the throat 78, and the boss 52 serves to retain the ball on that arm. The balls may be provided in different sizes representing dissimilar groups of atoms. For example, one of the balls may be used to represent a hydrogen atom, another a chlorine atom, etc.

Because the model components 20 may be readily molded of an inexpensive plastic material such as polystyrene and quickly assembled with the thin metal sleeves 16, the models may be manufactured and sold at a small fraction of the cost of the Dreiding models. The models may obviously be molded in a wide variety of colors and one or more of the flat faces of the tetrahedrons forming the nuclei of the models may be provided with a satin finish so that numbers or other indicia may easily be written on them. Preferably the styrene used is a relatively high impact material to afford the various connectors enough flexibility to enable them readily to be connected to form rings and other complex shapes without overstressing any of the parts.

It will be appreciated that with 10 tetrahedra and 8 balls, one can make models of alkanes and substituted alkanes, cycloalkanes, cis- and trans-decalin, adamantane, twistane, dextro and levo-lactic acid, the tartaric acids, the aldotetroses. He can do conformational analysis on meso- and dl-stilbene dibromide, on the chair, boat and twist forms of cyclohexane and substituted cyclohexanes, on the decalins. With sections of rubber tubing as connectors, he can make a model of ethylene which shows clearly that the members of the double bond are in a plane perpendicular to the plane of the C–H bonds. Geometrically isomeric olefins and optically active allenes are hence accessible. Three connectors are used to form acetylene. The three cyclopropane-1,2-dicarboxylic acids can be constructed with rubber connectors; a longer piece of tubing serves as a carbonyl group. Cyclobutane can be built without connectors if each pair of bonds to be strained are those connected by solid plastic and not by a cemented section.

Having described this invention in detail, those skilled in the art will appreciate that numerous modifications may be made of it without departing from its spirit. Therefore, I do not intend to limit the breadth of this invention to the specific embodiments illustrated and described. Rather, it is intended that the breadth of this invention be determined by the appended claims and their equivalents.

What is claimed is:

1. An atomic model comprising
a plastic nucleus defining an equilateral tetrahedron,
connectors extending outwardly from each of the four corners of the tetrahedron and each being of the same length,
two of said connectors being rod-like in form and the other two connectors being tubular and adapted to engagably receive the rod-like connectors of an identical model,
said nucleus being composed of two identically-shaped half-tetrahedrons having square mating faces,
and a pin and a recess aligned diagonally in identical positions on each of the mating faces and constructed and arranged to mate with their opposite when the two faces are rotated with respect to each other and assembled together.

2. An atomic model comprising,
a plastic nucleus defining a polyhedron,
connectors extending outwardly from and integral with each of at least four corners of the polyhedron and each being of the same length,
two of said connectors being rod-like in form and the other two connectors being tubular and adapted to engagably receive the rod-like connectors of an identical model,
said nucleus being composed of two identically shaped half-polyhedrons having flat mating surfaces and at least two connectors,
and an inter-engaging means in identical positions on each of the mating faces and constructed and arranged to mate with their opposite when the two faces are rotated with regard to each other and assembled together.

3. An atomic model in accordance with claim 1 wherein each of said half-tetrahedrons has two connectors integral with said half-tetrahedrons with one of said connectors comprising an arm longer than an arm of another,
a tubular member secured to the shorter of the arms and adapted to yieldably engage a rod-like connector arm of another similar atomic model.

4. An atomic model as defined in claim 3 and further characterized by a boss extending outwardly from the end of each rod-like connector arm, and a throat provided intermediate the ends of the tubular member through which a boss on a rod-like connector arm on a like model may snap to retain the rod-like connector arm.

5. An atomic model in accordance with claim 2 and further comprising at least two connectors of each of said two identically shaped half-polyhedrons being positioned in a plane with the plane of each pair of arms on each of the two identically shaped half-polyhedrons being positioned substantially perpendicular to each other.

References Cited by the Examiner

UNITED STATES PATENTS

| | | |
|---|---|---|
| 2,216,915 | 10/1940 | Johnson. |
| 2,962,820 | 12/1960 | Petersen _____ 35—18 |
| 2,974,425 | 3/1961 | Dreiding _____ 35—18 |
| 3,066,501 | 12/1962 | Charles et al. _____ 35—18 X |

FOREIGN PATENTS 994,566  8/1951  France.

EUGENE R. CAPOZIO, *Primary Examiner.*

JEROME SCHNALL, *Examiner.*